US011346672B2

(12) United States Patent
Kline et al.

(10) Patent No.: US 11,346,672 B2
(45) Date of Patent: May 31, 2022

(54) MULTI-MODE ROUTE SELECTION

(71) Applicant: INTERNATIONAL BUSINESS MACHINES CORPORATION, Armonk, NY (US)

(72) Inventors: Eric V. Kline, Pine Island, MN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 16/520,788

(22) Filed: Jul. 24, 2019

(65) Prior Publication Data

US 2021/0025721 A1   Jan. 28, 2021

(51) Int. Cl.
*G01C 21/34* (2006.01)
*G01C 21/36* (2006.01)

(52) U.S. Cl.
CPC ....... *G01C 21/3423* (2013.01); *G01C 21/365* (2013.01); *G01C 21/3697* (2013.01)

(58) Field of Classification Search
CPC .............. G01C 21/3423; G01C 21/365; G01C 21/3697
See application file for complete search history.

(56) References Cited

U.S. PATENT DOCUMENTS

| 9,404,760 B2 | 8/2016 | Ulloa Paredes | |
|---|---|---|---|
| 9,594,772 B2 | 3/2017 | Bridgen | |
| 10,895,463 B1* | 1/2021 | Cope | G01C 21/3484 |
| 2014/0188788 A1* | 7/2014 | Bridgen | G06F 16/29 |
| | | | 707/609 |
| 2015/0209616 A1* | 7/2015 | Azose | G06Q 30/0631 |
| | | | 434/247 |
| 2015/0285643 A1* | 10/2015 | Tucker | H04L 51/32 |
| | | | 701/519 |
| 2017/0276494 A1* | 9/2017 | Kusano | G01C 21/3415 |
| 2017/0350703 A1* | 12/2017 | McGavran | G06N 20/00 |
| 2019/0056233 A1* | 2/2019 | Liu | G01C 21/3423 |

(Continued)

FOREIGN PATENT DOCUMENTS

WO    2017160374 A1    9/2017

OTHER PUBLICATIONS

Disclosed Anonymously, "Method and System for Proving a Multi-Model Transportation Plan based on a Traveling Aggregate", IP.com—IPCOM000256139D, Nov. 7, 2018, pp. 1-4.

*Primary Examiner* — Rami Khatib
*Assistant Examiner* — Gabriel J Lambert
(74) *Attorney, Agent, or Firm* — Tihon Poltavets (57) ABSTRACT

A method managing a generated route for multiple modes of transportation includes displaying guidance for a generated route based on a travel itinerary between an origin location and a destination location, wherein the generated route includes at least one mode of transportation alteration. The method receives user data associated with a user traveling at a specific point along the generated route. The method generates a confidence score for the user traveling along generated route based on the received user data. Responsive to determining the confidence score is below a confidence level threshold, the method modifies the generated route based on an analysis of the generated route at the specific point, wherein the modified route causes the confidence score to increase above the confidence level threshold. The method displays guidance for the modified route.

18 Claims, 5 Drawing Sheets

(56) References Cited

U.S. PATENT DOCUMENTS

2019/0064801 A1* 2/2019 Frazzoli ............... G05D 1/0088
2019/0086221 A1   3/2019 Thiyagarajan
2019/0291746 A1* 9/2019 Cullinane ................. B60R 1/00
2020/0282980 A1* 9/2020 Kinoshita ............. B60W 40/04

* cited by examiner

MULTI-MODE ROUTE SELECTION

FIELD OF INVENTION

This disclosure relates generally to multi-mode route selection, and in particular to managing a multi-mode route utilizing confidence levels based on user and travel data.

BACKGROUND OF THE INVENTION

Typical web mapping services provide routing planning for multiple modes of transportation such as traveling by foot, vehicle, bicycle, air, and public transportation (e.g., public bus or metro). A traveling user is able to select a single mode of transport and an available route, where the web mapping service provides step-by-step audio and visual guidance to the traveling user. Furthermore, the traveling user is able to select fixed parameters when selecting an available route for the single mode of transport, such as avoiding toll roads and/or highways. Web mapping services are also able to provide updates to the selected route, where the selected route is updated to avoid certain situations such as, traffic congestion or closed roads.

SUMMARY

Embodiments in accordance with the present invention disclose a method, computer program product and computer system for managing a generate route utilizing multiple modes of transportation, the method, computer program product and computer system can display guidance for a generated route based on a travel itinerary between an origin location and a destination location, wherein the generated route includes at least one mode of transportation alteration. The method, computer program product and computer system can receive user data associated with a user traveling at a specific point along the generated route. The method, computer program product and computer system can generate a confidence score for the user traveling along generated route based on the received user data. The method, computer program product and computer system can, responsive to determining the confidence score is below a confidence level threshold, modify the generated route based on an analysis of the generated route at the specific point, wherein the modified route causes the confidence score to increase above the confidence level threshold. The method, computer program product and computer system can display guidance for the modified route.

DETAILED DESCRIPTION

Embodiments of the present invention manage a multi-mode route utilizing user data and travel data to generate a route and modify a route based on varying confidence levels of a traveling user. Embodiments of the present invention can utilizes animation, video clips, and/or virtual reality technology to guide the traveling user between multiple modes of transportation, where the guidance allows for the traveling user to understand if a confidence level is above a confidence level threshold to proceed along the generated route with the multiple modes of transportation. Based on the confidence level, a recommendation and/or route modification can occur to instruct the traveling user to alter a mode of transportation to increase the confidence level of the traveling user. The confidence level for the traveling user is generated based on an analysis of the generated route at a specific point and user data being received from one or more client devices associated with the traveling user.

Figure 1:
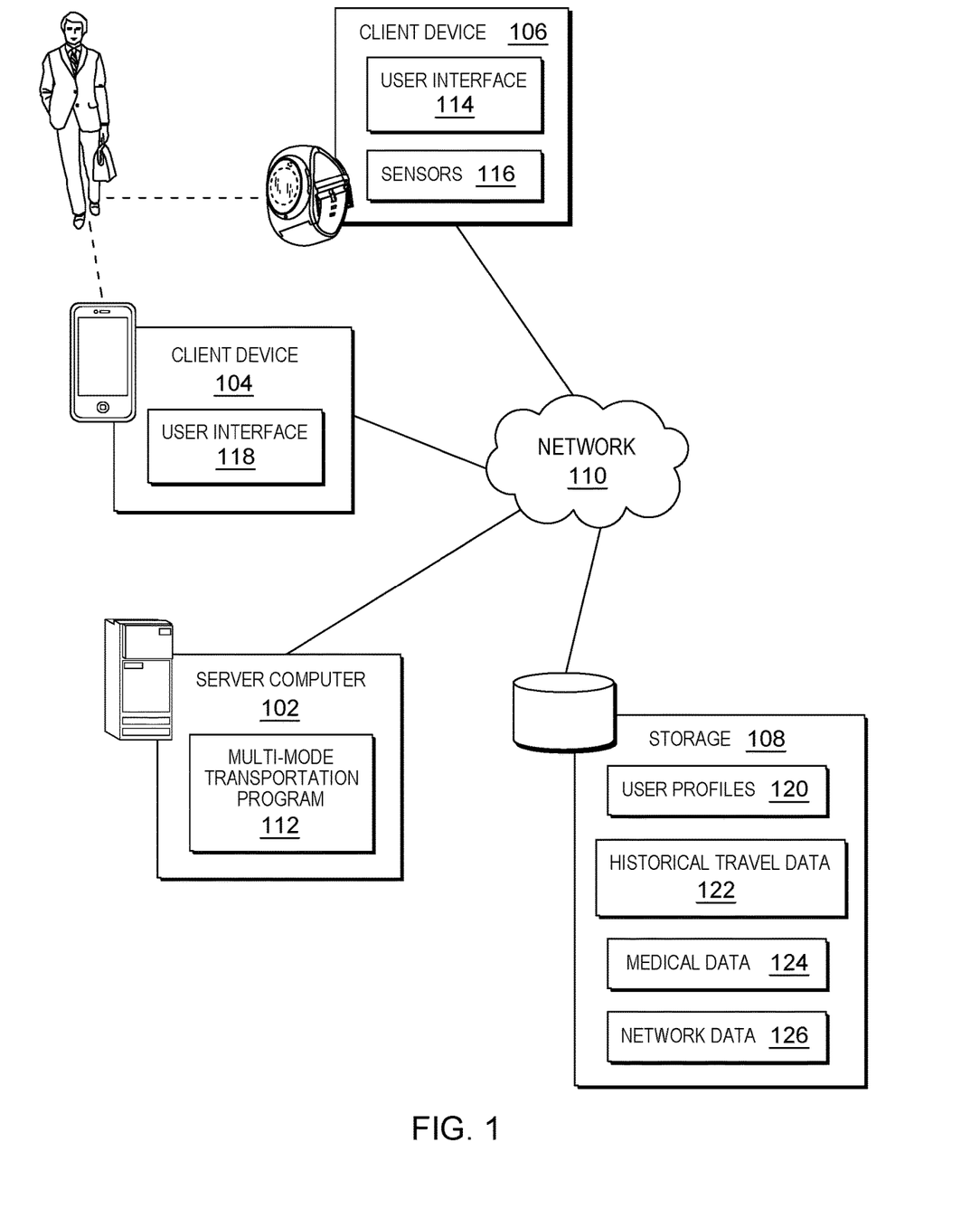
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client device 104, client device 106, and storage 108 all interconnected over network 110. For discussion purposes, multi-mode transportation program 112 operates on server computer 102 but can also operate on client device 104 and/or client device 106.

Server computer 102 may be a desktop computer, a laptop computer, a tablet computer, a specialized computer server, a smartphone, or any computer system capable of executing the various embodiments of multi-mode transportation program 112. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes multi-mode transportation program 112 capable of communicating with client device 104, client device 106, and storage 108.

Client device 104 may be a cellphone, smartphone, smartwatch, laptop, tablet computer, or any other electronic device capable of communicating via network 110. Client device 104 includes user interface 118 to allow for a user of client device 104 to interact with multi-mode transportation program 112 on server computer 102. As previously mentioned, multi-mode transportation program 112 can operate on client device 104, where one or more functions of multi-mode transportation program 112 are performed on both, the server side (i.e., server computer 102) and the client side (i.e., client device 104). In one embodiment, client device 104 is a cellphone associated with a user utilizing multi-mode transportation program 112 to navigate from a first location to a second location via multiple modes of transportation. In another embodiment, client device 104 is an integrated infotainment system in a vehicle associated with a user utilizing multi-mode transportation program 112 to navigate from a first location to a second location via multiple modes of transportation, where the vehicle represents one of the modes of transportation. As a user of client device 104 switches from the vehicle (i.e., a first mode of transportation) to an airplane (i.e., a second mode of transportation), the user can switch to client device 106 to continue the route guidance and management between the multiple modes of transportation.

Similar to client device 104, client device 106 may be a cellphone, smartphone, smartwatch, laptop, tablet computer, or any other electronic device capable of communicating via network 110. Client device 106 includes user interface 114 to allow for a user of client device 106 to interact with multi-mode transportation program 112 on server computer 102. As previously mentioned, multi-mode transportation program 112 can operate on client device 106, where one or more functions of multi-mode transportation program 112 are performed on both, the server side (i.e., server computer 102) and the client side (i.e., client device 106). Client device 106 includes sensors 116 for collecting biometric data of a user associated with client device 106 and environmental data in an area surrounding the user associate with client device 106. A user of client device 106 has the ability to customize and limit the biometric data and environmental data collected by sensors 116. Sensors 116 can include an accelerometer, a gyroscope, a magnetometer, barometric pressure sensors, ambient temperature sensor, heart rate monitor, oximetry sensors, skin conductance sensor, and skin temperature sensor. Biometric data can include but is not limited to heart rate, blood pressure, movement, temperature, humidity, and oxygen levels. Environmental data can include but is not limited to temperature, humidity, and barometric pressure. In the previously discussed embodiment, a user switches from the first mode of transportation (e.g., vehicle) to the second mode of transportation (e.g., airplane), the user can seamlessly interact with multi-mode transportation program 112 as the user switches between the utilization of client device 104 to client device 106 to for continued route guidance and management between the multiple modes of transportation. Client device 104 and client device 106 can each include location services for identifying a location of client device 104 and client device 106.

Multi-mode transportation program 112 manages a multi-mode route utilizing user and travel data to provide route guidance and mode of transportation recommendations. Multi-mode transportation program 112 can identify a user profile for a user by accessing user profiles 120 in storage 108 via network 110. Multi-mode transportation program 112 can receive a travel itinerary from the user via user interface 118 of client device 104 and/or user interface 114 of client device 106, where the travel itinerary specifies an origin location and a destination location. Multi-mode transportation program 112 can receive travel data associated with the user by retrieving historical travel data 122, medical data 124, and network data 126 in storage 108 via network 110. Multi-mode transportation program 112 can receive current travel data for the user by retrieving current travel data from sensors 116 on client device 106 via network 110.

Multi-mode transportation program 112 can receive travel conditions data for multiple modes of transportation by querying publicly available information for one or more statuses associated with each of the multiple modes of transportation. With the received data, multi-mode transportation program 112 can generate a route for the travel itinerary and initialize guidance for the generate route, where guidance is displayed in user interface 118 of client device 104 and/or user interface 114 of client device 106.

While displaying guidance for the generated route, multi-mode transportation program 112 can receive user data along the route as the user travels between the origin location and the destination location. Multi-mode transportation program 112 can utilize the received user data to generate a confidence score for the user along the route and if multi-mode transportation program 112 determines the destination location has not been reached, multi-mode transportation program 112 can determine whether the confidence score is above a pre-defined threshold. Responsive to multi-mode transportation program 112 determining the confidence score is not above a pre-defined threshold, multi-mode transportation program 112 can modify the generated route to increase the confidence score and display guidance for the modified route.

As previously discussed, storage 108 includes user profiles 120, historical travel data 122, medical data 124, and network data 126, where server computer 102 with multi-mode transportation program 112 has access to storage 108 via network 110. User profiles 120 includes user preference information associated with a plurality of users that multi-mode transportation program 112 can utilize to identify a user. User profiles 120 allow for the user to seamlessly switch between client device 104 and client device 106 while multi-mode transportation program 112 displays guidance for a generated route. Historical travel data 122 is associated with user profiles 120 and includes previous trip information for each user associated with a single user profile 120, such as an origin and destination for each previous trip, modes of transportation utilized for each previous trip, duration of travel for each previous trip, expected duration of travel for each previous trip, a number of accompanying users for each previous trip, and an estimated cost for each previous trip (e.g., fuel cost, airline ticket cost). Medical data 124 is associated with user profiles 120 and includes medical condition information for each user associated with a single user profile 120, such as a heart condition or diagnosed arthritis. A user has the ability to opt-in having medical data 124 collected, stored, and utilized by multi-mode transportation program 112 to ensure the privacy of the user is maintained. Network data 126 is associated with user profiles 120 and includes social relationship information (spouse, friend etc.) between each user associated with a single user profile 120 and one or more other users, along with whether the one or more other users have previously traveled with each user associated with the single user profile 120. In other embodiments, user profiles 120, historical travel data 122, medical data 124, and network data 126 are stored on server computer 102 from which multi-mode transportation program 112 operates.

In general, network 110 can be any combination of connections and protocols that will support communications between server computer 102, client device 104, client device 106, and storage 108. Network 118 can include, for example, a local area network (LAN), a wide area network (WAN), such as the internet, a cellular network, or any combination of the preceding, and can further include wired, wireless, and/or fiber optic connections. In one embodiment, multi-mode transportation program 112 can be a web service accessible via network 110 to a user of client device 104 and/or client device 106. In another embodiment, multi-mode transportation program 112 may be operated directly by a user of server computer 102.

Figure 2A:
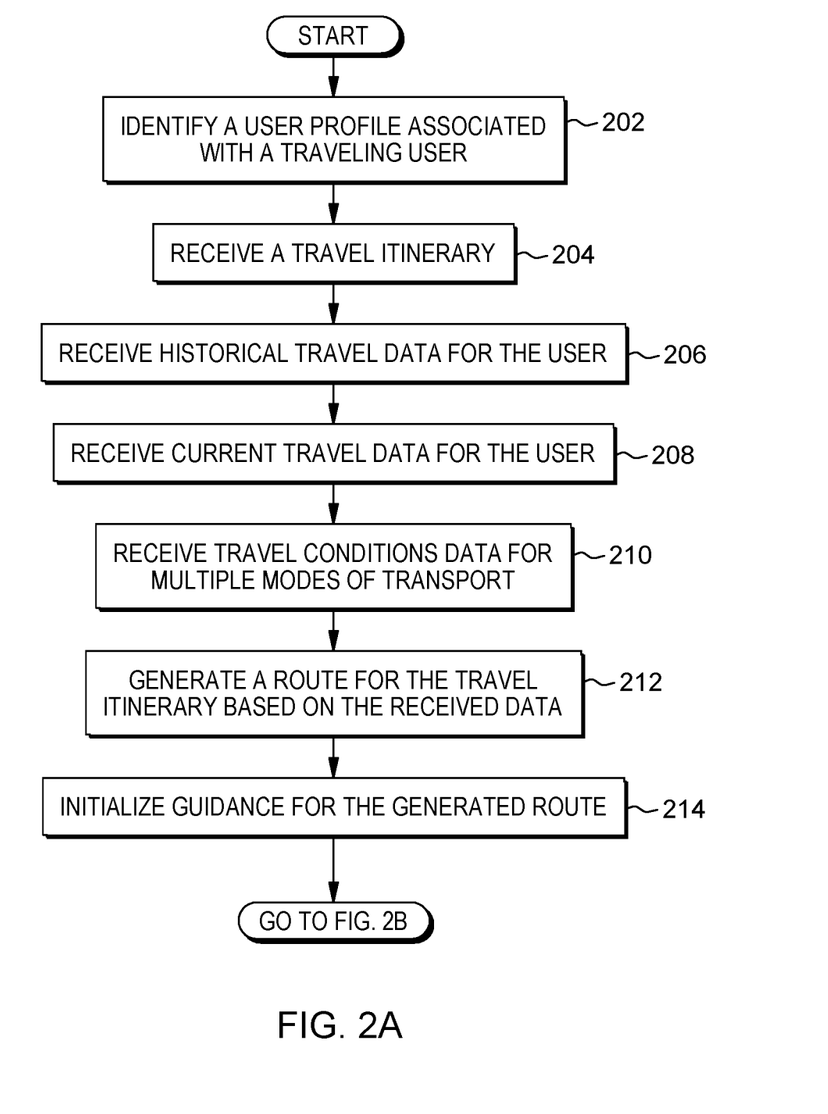
FIG. 2A is a flowchart depicting operational steps of a multi-mode transportation program for initializing guidance for a generated route, in accordance with an embodiment of the present invention.

FIG. 2A is a flowchart depicting operational steps of a multi-mode transportation program for initializing guidance for a generated route, in accordance with an embodiment of the present invention.

Multi-mode transportation program 112 identifies (202) a user profile associated with a traveling user. Multi-mode transportation program 112 utilizes a plurality of user profiles for identifying a plurality of users, where each user profile is associated with a user (i.e., traveling user). Each user profile is a digital representation of the user, where multi-mode transportation program 112 manages the plurality of user profiles which can include one or more preferences as defined by the user. Multi-mode transportation program 112 can utilize identification credentials (i.e., user name and password combination) to verify a user and to grant access to a specific user profile associated with the verified user, where the user can alter the one or more preferences. In one embodiment, the user profile associated with the user includes a mode of transportation preference, where multiple modes of preferred transportation are ranked by the user according to categories. The categories can include private transportation, public transportation, and manual based transportation. Private transportation can include utilizing a personal vehicle, personal water transport, and a personal air transport. Public transportation can include utilizing a public bus, a public train, an airline, and a car for hire (e.g., taxi, rideshare). Manual based transportation can include utilizing a bicycle and walking. The user can rank the transportation for a multi-mode transportation route based on preference, where a route by a public train is preferred over a route by a public bus or a route by bicycle is preferred over a route by walking.

Preferences in the user profile can also limit an amount of types and/or categories of transportation utilized by multi-mode transportation program 112 when generating a route for a travel itinerary. For example, a preference in the user profile can state that any route that multi-mode transportation program 112 generates should include three or fewer types of transportation. Preferences in the user profile can also include a monetary limit for a cost associated with a route that multi-mode transportation program 112 generates. For example, the user profile can include a monetary limit of $30 dollars for a travel itinerary that multi-mode transportation program 112 receives, where the monetary limit is for associated costs that includes fuel, tolls, and calculated wear and tear on a vehicle for a distance to be traveled based on the travel itinerary. Preferences in the user profile can also include an environmental impact limit associated with a route that multi-mode transportation program 112 generates. For example, a route that multi-mode transportation program 112 generates that includes a bicycle as one of the mode of transportation would have a lower environmental impact compared to a route that include a personal vehicle. Multi-mode transportation program 112 can select one or more modes of transportation that are possible for completing the travel itinerary that would produce the lowest environmental impact. Preferences in the user profile can also include user defined time limits for each type of transportation associated with a route that multi-mode transportation program 112 generates. For example, multi-mode transportation program 112 can generate a route utilizing a personal vehicle between the hours of 8 am and 8 pm or can generate a route utilizing public transportation (i.e., bus or train) between the hours of 9 am and 4 pm. Furthermore, the time limits can include an amount of time spent (e.g., 3 hours) in each of the modes of transportation during travel for the route that multi-mode transportation program 112 generates.

The user profile for the user traveling can also include medical data if the user previously choose to opt-in, thus allowing multi-mode transportation program 112 to have access to medical data for the user. The medical data includes medical condition information associated with the user, such as a heart condition, diagnosed arthritis, a knee injury, or any type of medical condition capable of affecting a confidence level of a user utilizing a specific mode of transportation. The confidence level of the user utilizing a specific mode of transportation is discussed in further detail with regards to FIG. 2B. In one example, medical data associated with the user profile for the user states that the user is recovering from a knee injury. Multi-mode transportation program 112 has the ability to generate a route utilizing multi-modes of transportations that avoid or limit an amount of utilization of a specific mode of transportation that might aggravate the knee injury, such as bicycling or walking. In another example, medical data associated with the user profile for the user states that user is six feet ten inches tall. Multi-mode transportation program 112 has the ability to generate a route utilizing multiple modes of transportation, along with a recommendation for each of the multiple modes of transportation based on the medical data. The recommendation can include a preferred seat on an airline or a type of car for hire (e.g., SUV) with additional leg room.

Multi-mode transportation program 112 receives (204) a travel itinerary for the user. The travel itinerary indicates a type of trip (e.g., leisure, business) includes an origin location for the user and a destination location, the origin location is a start location of a generated route and the destination location is a finish location of the generated route. The travel itinerary can include a list of one or more users who are to accompany the user on the journey, along with a social relationship (e.g., family, friend, co-worker) between the user traveling and each of the accompanying user. Multi-mode transportation program 112 has the ability to eliminate or provide recommendations for particular modes of transportation based on an amount of users accompanying the user on the journey. For example, if four users are to accompany the user traveling, multi-mode transportation program 112 has the ability to eliminate a personal vehicle of the user as a mode of transportation since the personal vehicle only has seating for two user. In another example, multi-mode transportation program 112 has the ability to eliminate bicycling as a mode of transportation since generating a route for five total user can negatively impact a confidence score (discussed in further detail with regards to FIG. 2B) for the user traveling. The travel itinerary can also include an expected time of travel, where multi-mode transportation program 112 has the ability to eliminate one or more modes of transportation based on preferences associated in the user profile associated with the user traveling. For example, if the expected time of travel is 9 pm and the multi-mode transportation program 112 determines a preference in the user profile states a personal vehicle can be utilized between the hours of 8 am and 8 pm, multi-mode transportation program 112 can eliminate the personal vehicle from consideration when generating a route for the travel itinerary.

Multi-mode transportation program 112 receives (206) historical travel data for the user. Historical travel data includes various trip information associated with previously generate routes for the user. Multi-mode transportation program 112 utilizes historical travel data and machine learning to generate routes while considering previous trip information, along with any modifications that multi-mode transportation program 112 performs during a trip to ensure a confidence level for the user is maintained. For example, if a user's confidence level drops below a threshold while utilizing a specific mode of transportation (i.e., personal vehicle) during multiple journeys, multi-mode transportation program 112 can identify a pattern and no longer include the specific mode of transportation when generating a route. Multi-mode transportation program 112 can replace the specific mode of transportation (i.e., personal vehicle) with another mode of transportations, such as a car for hire.

Multi-mode transportation program 112 receives (208) current travel data for the user. Multi-mode transportation program 112 can receive the current travel data via a user input on a client device associated with the user or via one or more IoT (Internet of Things) devices capable of capturing information through one or more sensors and one or more cameras. Current travel data can include a number, a weight, and type of luggage the user is traveling with, where multi-mode transportation program 112 has the ability to eliminate a specific mode of transportation based on the luggage the user is traveling. For example, if the user is traveling with a forty-five pound wheeled luggage, multi-mode transportation program 112 eliminates bicycling and walking as a mode of transportation for utilization on the generated route. Current travel data can also include information that supersedes one or more preferences associated with the user profile for the user or provides further limitation to the one or more preferences associated with the user profile. For example, a user is traveling with four users and a preference associated with the user profile states the user prefers utilizing a car for hire as a mode of transportation. Multi-mode transportation program 112 can receive current travel data via a user input requesting a specific type of vehicle (e.g., SUV) as the car for hire to accommodate the four users and any respective luggage the four user are traveling with.

Multi-mode transportation program 112 receives (210) travel conditions data for multiple modes of transport. In this embodiment, multi-mode transportation program 112 receives travel conditions data based for multiple modes of transportation based on the origin location and the destination location. Travel conditions can include traffic information, road work information, road closure information, transportation location, weather conditions, toll information, congestion charge information, flight status, airport status, vehicle status, aircraft status, and nautical vessel status. Multi-mode transportation program 112 can receive traffic information, road work information, and road closure information from a web based mapping service and utilize this travel condition data when generating a route. Multi-mode transportation program 112 can receive transportation location information from the transporter or from a web based service providing platform tracking the location of a transporter. For example, if the transporter is a personal vehicle, multi-mode transportation program 112 can receive transporter location information directly from the personal vehicle. In another example, if the transporter is a ride share scooter, multi-mode transportation program 112 can receive transporter location information for one or more ride share scooters in a vicinity from the web based service that provides the ride sharing platform. Fight status provides information regarding a specific flight and whether the flight is scheduled to leave on time, is delayed, or canceled. Airport status provides information regarding operations of the airport and whether the airport is experiencing any delays or closures. Multi-mode transportation program 112 can receive vehicle status, aircraft status, and nautical vessel status directly from the transporter and provides information on a readiness of the transporter to perform a journey based on the travel itinerary.

Multi-mode transportation program 112 generates (212) a route for the travel itinerary based on the received data. In this embodiment, multi-mode transportation program 112 generates a route for the travel itinerary based on the received historical travel data, current travel data, travel conditions data, and one or more preferences associated with the identified user profile. In one example, multi-mode transportation program 112 generate a route that includes three modes of transportation between an origin location and a destination location, where the three modes of transportation include a car for hire, a personal vehicle, and walking. Multi-mode transportation program 112 identifies, based on the received current travel data, the user is traveling with forty-fine pound luggage and identifies, based on the user profile, the user has a heart condition (i.e., medical condition). Multi-mode transportation program 112 determines that the personal vehicle associated with the user requires walking with the luggage in excess of a pre-defined amount of time (e.g., 3 minutes) for someone with a medical condition. As a result, multi-mode transportation program 112 generates a route where a car for hire is utilized to transport the user from the origin location (e.g., apartment building) to the personal vehicle location (e.g., parking garage), the generated route directs the personal vehicle to a vicinity (e.g., airport parking lot) near the destination location, and the generated route directs the user to walk the final hundred feet to the destination (e.g., airport terminal) location.

In another example, multi-mode transportation program 112 generates a route that includes two modes of transportation between an origin location and a destination location, where the two modes of transportation include a public bus and a public train. Multi-mode transportation program 112 identifies, based on the user profile, a preference with a monetary limit for cost of travel and identifies, based on the travel conditions, a congestion charge is in effect for the time of expected travel. Though the user has a personal vehicle, multi-mode transportation program 112 determines that due to the congestion charge and estimated fuel costs for the travel itinerary, traveling by the personal vehicle will cost around sixteen dollars. However, multi-mode transportation program 112 determines the estimated cost of the public bus and the public train for the travel itinerary will cost around six dollars. Though a time of travel might be greater for utilizing the two modes of transportation (i.e., public bus and public train) versus a single mode of transportation (i.e., personal vehicle), multi-mode transportation program 112 determines the user preference of the monetary limit takes priority over time of travel. As a result, multi-mode transportation program 112 generates a route directing the user to take the public bus from station A (i.e., origin location) to station B, where the generate route directs the user to transfer to the public train and continue on the journey to station C (i.e., destination location).

Multi-mode transportation program 112 has the ability to generate a route and display one or more optional routes to the user for selection prior to initializing guidance. From the previously discussed example, multi-mode transportation program 112 can display a generated route with the personal vehicle, a monetary cost of travel with the personal vehicle, and an expected time of arrival. Multi-mode transportation program 112 can also display a generated route with the two modes of transportation (i.e., public bus and public train), a monetary cost of travel with the two modes of transportation, and an expected time of arrival. Multi-mode transportation program 112 can also highlight the monetary cost of travel to signal which of the determining factors of the generated route takes priority. Multi-mode transportation program 112 has the ability to receive a selection of one of the two generated routes via a user input.

Multi-mode transportation program 112 initializes (214) guidance for the generated route. In one embodiment, multi-mode transportation program 112 has the ability to generate a route and display one or more optional routes to the user for selection prior to initializing guidance. From the previously discussed example, multi-mode transportation program 112 can display a generated route with the personal vehicle, a monetary cost of travel with the personal vehicle, and an expected time of arrival. Multi-mode transportation program 112 can also display a generated route with the two modes of transportation (i.e., public bus and public train), a monetary cost of travel with the two modes of transportation, and an expected time of arrival. Multi-mode transportation program 112 can also highlight the monetary cost of travel to signal which of the determining factors of the generated route takes priority. Multi-mode transportation program 112 has the ability to receive a selection of one of the two generated routes via a user input. In another embodiment, multi-mode transportation program 112 initializes guidance for the generated route without any additional user input.

Figure 2B:
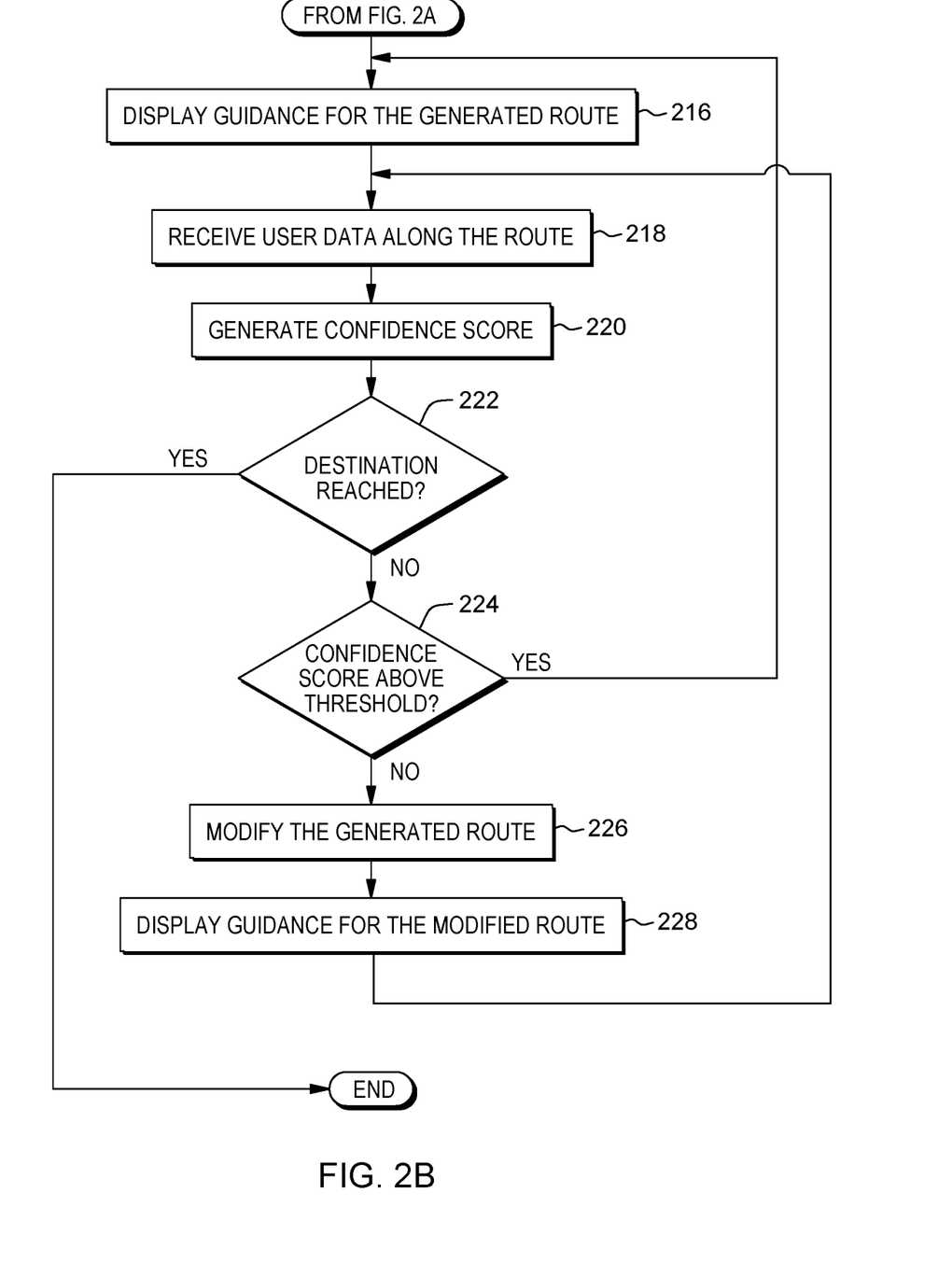
FIG. 2B is a flowchart depicting operational steps of a multi-mode transportation program for modifying a generated route based on a confidence score, in accordance with an embodiment of the present invention.

FIG. 2B is a flowchart depicting operational steps of a multi-mode transportation program for modifying a generated route based on a confidence score, in accordance with an embodiment of the present invention.

Multi-mode transportation program 112 displays (216) guidance for the generated route. In one embodiment, multi-mode transportation program 112 displays guidance for the generated route in a user interface on a mobile device associated with the user, where the user is able to transfer between the multiple modes of transportations without experience a disruption of route guidance. Additionally, the mobile device can include one or more paired client devices (e.g., smart watch) that can also display guidance for the generated route in a user interface in each of the one or more paired client devices. In addition to displaying step-by-step route instructions and a highlighted map, multi-mode transportation program 112 has the ability to display an animation utilizing virtual reality (VR) technology with instructions on how to proceed between the multiple-modes of transportation. Multi-mode transportation program 112 can overlay the animations over an available street view setting of a mapping service or a live view captures by a camera on a VR glasses headset/device. The animation can display written instructions as guidance for the generated route and/or visual cues, such as arrows to guide the user along the generate route.

Multi-mode transportation program 112 can also display guidance for the generated route across two or more client device, where the two or more client devices are not paired with one another. For example, a first client device is a vehicle infotainment system in a personal vehicle associated with the user capable of displaying navigational information, independently from a second device that is a mobile phone. As multi-mode transportation program 112 displays guidance for a first portion of the generated route in the first client device associated with a first mode of transport, multi-mode transportation program 112 instructs the user to change to a second mode of transportation (i.e., walking). Multi-mode transportation program 112 ceases displaying the first portion of the generated route in the first device and displays guidance for a second remaining portion of the generated route in the second device.

Multi-mode transportation program 112 receives (218) user data along the route. In this embodiment, multi-mode transportation program 112 receives user data from a client device associated with the user at set intervals (e.g., 10 seconds) along the route as the user travels between the origin location and the destination location. In another embodiment, multi-mode transportation program 112 receives user data from a client device associated with the user at set checkpoints along the generated route, where the checkpoints are time and/or distance traveled based. In yet another embodiment, multi-mode transportation program 112 receives user data from a client device associated with the user at set checkpoints along the generated route, where the set checkpoints are associated with an occurrence of a change of mode of transportation along the generated route. The user data includes subsets of data, such as blood pressure, heart rate, body temperature, oxygen levels, and other biometric values capable of being capture by a wearable electronic device (e.g., smart watch device). Multi-mode transportation program 112 utilizes the received user data to determine a level of anxiety a traveling user is experiencing along the generated route, along with an rapid change in level of anxiety. In other embodiments, multi-mode transportation program 112 utilizes the received user data to determine if the traveling user is fatigued and/or becoming ill (e.g., oncoming fever).

Multi-mode transportation program 112 generates (220) a confidence score for the user. In this embodiment, multi-mode transportation program 112 utilizes an algorithm to calculate a confidence score utilizing the received user data and a weighted scale for each of the subsets of the received user data. For each subset of the received user data, multi-mode transportation program 112 can utilize a plurality of data ranges and assign a value to each of the plurality of data ranges when generating a confidence score. For example, multi-mode transportation program 112 assigns a value of 10 for a heart rate in the $60<x\le100$ beat per minute (bpm) range, a value of 9 for a heart rate in the $100<x\le105$ bpm range, a value of 8 for a hear rate in the $105<x\le110$ bpm, and the value continues decreasing for each bpm range increase. For each subset of the received user data, multi-mode transportation program 112 assigns higher values for subset data associated with lower anxiety levels and lower values for subset data associated with higher anxiety level. Multi-mode transportation program 112 compiles all the values for all the subsets of the received user data and generates the confidence score for the user via the sum of all the values. It is to be noted, multi-mode transportation program 112 can utilize various other algorithms to determine a level of anxiety for the user based on the received user data and generate a confidence score based on the determined level of anxiety, where a greater confidence score is associated with lower anxiety level and a lower confidence score is associated with a higher anxiety levels. As previously mentioned, multi-mode transportation program 112 can also utilize the received user data to determine if the traveling user is fatigued and/or becoming ill and can generate a confidence score for the user with regards to the user continuing on the generated route.

Multi-mode transportation program 112 determines (222) whether the user has reached the destination. In the event multi-mode transportation program 112 determines the user has not reached the destination ("no" branch, 222), multi-mode transportation program 112 determines (224) whether the confidence score is above a threshold. In the event multi-mode transportation program 112 determines the user has reached the destination ("yes" branch, 222), multi-mode transportation program 112 ceases displaying guidance for the generated route. In this embodiment, the destination location is the set final point in the travel itinerary that multi-mode transportation program 112 received in (204), where multi-mode transportation program 112 ceases displaying guidance for the generated route.

Multi-mode transportation program 112 determines (224) whether the confidence score is above a threshold. In the event multi-mode transportation program 112 determines the confidence score is not above the threshold ("no" branch, 224), multi-mode transportation program 112 modifies (226) the generated route. In the event multi-mode transportation program 112 determines the confidence score is above the threshold ("yes" branch 224), multi-mode transportation program 112 reverts back to continuing to display guidance for the generate route and receiving (218) user data along the route.

The confidence score threshold is a predetermined value that represents an anxiety level threshold of the user traveling along the generated route. In other embodiments, multi-mode transportation program 112 also utilizes a variation in confidence score threshold, where a rapid decrease in a current confidence score compared to a previous confidence score represents a rapid increase in anxiety levels and a rapid increase in a current confidence score compared to a previous confidence score represents a rapid decrease in anxiety levels. The variation in confidence score threshold can be triggered prior to the confidence score threshold, where multi-mode transportation program 112 determines to modify the generated route (226) prior to the actual confidence score falling below the confidence score threshold. Multi-mode transportation program 112 utilizes the variation in confidence score threshold to address the rapid increase in anxiety levels prior to the anxiety levels of the user falling below the confidence score threshold.

Multi-mode transportation program 112 modifies (226) the generated route. Multi-mode transportation program 112 modifies the generated route based on an analysis of one or more conditions at the specific point in the generated route for which the user data was received in (218). In one example, multi-mode transportation program 112 analyzes the generated route at the specific point in the generated route and determines a change in mode of transportation occurred when the confidence score did not exceed the confidence level threshold, where the user went from the public train to the public bus. Multi-mode transportation program 112 modifies the generated route by determining an alternative route, where the user can switch back to the public train from the public bus and continue to the destination location. In another example, multi-mode transportation program 112 analyzes the generated route at the specific point in the generated route and determines the user entered a highway road from a local road while utilizing a personal vehicle, when the confidence score did not exceed the confidence level threshold. Multi-mode transportation program 112 modifies the generated route by determining an alternative route, where multi-mode transportation program 112 instructs the user to exit the highway at the nearest exit ramp and proceed on the modified route that excludes highway roads.

In another example, multi-mode transportation program 112 analyzes the generated route at the specific point in the generated route and determines the user is becoming fatigued walking along a portion of the generated route, where the confidence score did not exceed the confidence level threshold. Multi-mode transportation program 112 modifies the generated route by determining an alternative mode of transportation, where multi-mode transportation program 112 instructs the user to proceed to a nearest public bus stop and proceed on the modified route on the public bus versus continuing to walk. In yet another example, multi-mode transportation program 112 analyzes the generated route at the specific point in the generated route and determines the user is becoming ill while traveling on a public train, when the confidence score did not exceed the confidence level threshold. Multi-mode transportation program 112 modifies the generated route by determining an alternative route and mode of transportation, where multi-mode transportation program 112 instructs the user to exit at the next station, change modes of transportation to a car for hire, and proceed on the modified route towards the final destination location. Additionally, multi-mode transportation program 112 has the ability to provide a recommendation to alter the final destination location to a hospital or a personal physician location, due to the oncoming illness.

Multi-mode transportation program 112 displays (228) the modified route. In one embodiment, multi-mode transportation program 112 displays guidance for the modified route in a user interface on a mobile device associated with the user, where the user is able to transfer between the multiple modes of transportations and/or alter a direction of travel, without experience a disruption of route guidance. Additionally, the mobile device can include one or more paired client devices (e.g., smart watch) that can also display guidance for the modified route in a user interface in each of the one or more paired client devices. In addition to displaying step-by-step route instructions and a highlighted map, multi-mode transportation program 112 has the ability to display an animation utilizing virtual reality (VR) technology with instructions on how to proceed between the multiple-modes of transportation and how to proceed along the modified route. Multi-mode transportation program 112 can overlay the animations over an available street view setting of a mapping service or a live view captures by a camera on a VR glasses headset/device. The animation can display written instructions as guidance for the generated route and/or visual cues, such as arrows to guide the user along the generate route. An amount of information and/or assistance guides (e.g., visual cues) that multi-mode transportation program 112 displays can increase with each modification of generates route that occurs to further assist the user with increasing a confidence score.

Figure 3A:
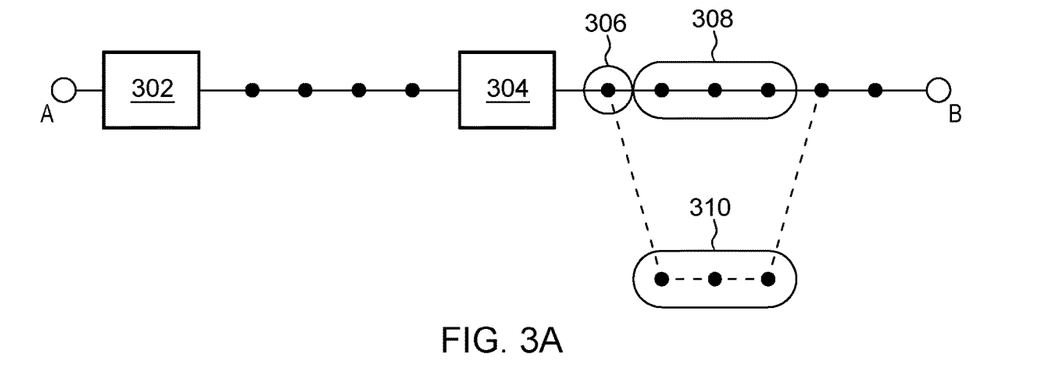
FIG. 3A is an example of a modified route by multi-mode transportation program, in accordance with an embodiment of the present invention.

FIG. 3A is an example of a modified route by multi-mode transportation program, in accordance with an embodiment of the present invention. Multi-mode transportation program 112 generates a route utilizing multiple modes of transportation based on an itinerary for travel between origin location A and destination location B, where multi-mode transportation program 112 instructs a user to alter a mode of transportation at point 302 and point 304. In this embodiment, multi-mode transportation program 112 instructs (i.e., displays guidance) the traveling user to proceed from origin location A towards point 302 and walk (i.e., first mode of transportation) on an initial portion of the route towards point 304 along the generated route. As the user approaches point 304, multi-mode transportation program 112 instructs the user to alter the mode of transportation at point 304 to a personal vehicle and continue on the remaining portion of the route towards destination location B in the personal vehicle. While the user is traveling in the personal vehicle, multi-mode transportation program 112 receives user data at point 306, generates a confidence score, and determines the confidence score is no longer above the confidence score threshold. Multi-mode transportation program 112 analyzes the generated route at point 306 and determines the user proceeded to enter a highway road from a local road in the person vehicle. Multi-mode transportation program 112 modifies the generated route by instructing the user to exit at next exit ramp to avoid portion 308, where portion 308 represents a remaining highway road portion of the previously generated route. Multi-mode transportation program 112 displays guidance for the modified route that includes proceeding on portion 310 towards destination location B, where portion 310 represents a local road portion avoiding portion 308 (i.e., the remaining highway road portion).

Figure 3B:
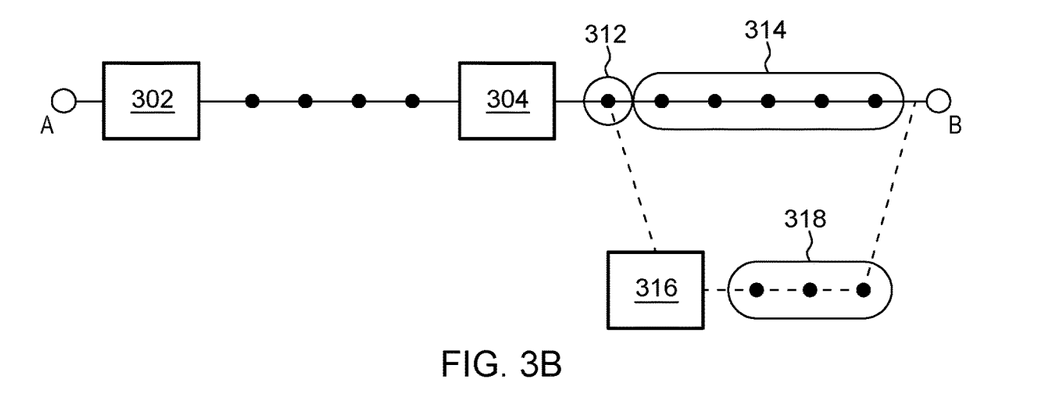
FIG. 3B is an example of a modified route by multi-mode transportation program, in accordance with an embodiment of the present invention.

FIG. 3B is an example of a modified route by multi-mode transportation program, in accordance with an embodiment of the present invention. Multi-mode transportation program 112 generates a route utilizing multiple modes of transportation based on an itinerary for travel between origin location A and destination location B, where multi-mode transportation program 112 instructs a user to alter a mode of transportation at point 302 and point 304. In this embodiment, multi-mode transportation program 112 instructs (i.e., displays guidance) the traveling user to proceed from origin location A towards point 302 and board a public train (i.e., first mode of transportation) on an initial portion of the route towards point 304 along the generated route. As the user approaches point 304, multi-mode transportation program 112 instructs the user to alter the mode of transportation at point 304 to a public bus and continue on the remaining portion of the route towards destination location B on the public bus. While the user is traveling on the public bus, multi-mode transportation program 112 receives user data at point 312, generates a confidence score, and determines the confidence score is no longer above the confidence score threshold. Multi-mode transportation program 112 analyzes the generated route at point 312 and determines a change in mode of transportation cased the decrease in confidence level. Multi-mode transportation program 112 modifies the generated route by instructing the user to exit the public bus at the next bus stop, where portion 314 represents a remaining portion of travel on the public bus for the previously generated route. Multi-mode transportation program 112 displays guidance for the modified route that includes proceeding to point 316, where multi-mode transportation program 112 instructs the user to change the mode of transportation to a car for hire and proceed to destination location B via portion 318 in the car for hire.

Figure 3C:
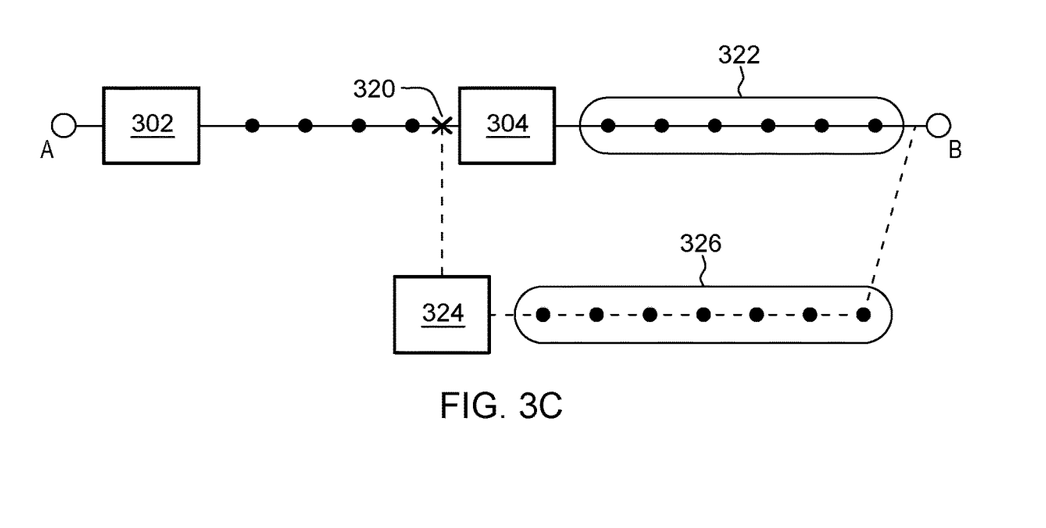
FIG. 3C is an example of a modified route by multi-mode transportation program, in accordance with an embodiment of the present invention.

FIG. 3C is an example of a modified route by multi-mode transportation program, in accordance with an embodiment of the present invention. Multi-mode transportation program 112 generates a route utilizing multiple modes of transportation based on an itinerary for travel between origin location A and destination location B, where multi-mode transportation program 112 instructs a user to alter a mode of transportation at point 302 and point 304. In this embodiment, multi-mode transportation program 112 instructs (i.e., displays guidance) the traveling user to proceed from origin location A towards point 302 and board a public bus (i.e., first mode of transportation) on an initial portion of the route towards point 304 along the generated route. Point 304 represents a connecting bus, where the user transfers from the first public bus to a second public bus (i.e., mode of transportation alteration). While the user is traveling on the first public bus, multi-mode transportation program 112 receives user data at point 320, generates a confidence score, and determines the confidence score is no longer above the confidence score threshold. Multi-mode transportation program 112 analyzes the generated route at point 320 and determines the user is experience fatigue from sitting on 6 hours on the first public bus. Multi-mode transportation program 112 modifies the generated route by instructing the user to proceed to point 324 (i.e., an airport) and take a flight for a remaining portion of the journey. Portion 322 represents a remaining portion of travel on the second public bus for the previously generated route and portion 324 represents a remaining portion of travel on an airplane for the modified route. Multi-mode transportation program 112 displays guidance for the modified route that includes proceeding to point 325, where multi-mode transportation program 112 instructs the user to change the mode of transportation to an airplane and proceed to destination location B via a flight on portion 324.

In other embodiments, multi-mode transportation program 112 receives information from different modes of transportation that includes different stations where a mode of transportation can be changes, where the information can include geographic metadata and crowdsourced information. The geographic metadata can include station information such as what facilities and assistance features (e.g., escalator, elevator) are available and peak hours of travel information. The crowdsource information can include mobility patters, photos captured and shared between two or more traveling users at specific station. Multi-mode transportation program 112 can analyze efficiencies of each station based on information captures by various IoT devices present at each station and determine if a specific station is experiencing particular issues (e.g., broken elevator). As multi-mode transportation program 112 generates a route for the travel itinerary, multi-mode transportation program 112 has the ability to receive user feedback to mature a knowledge system of multi-mode transportation program 112 for providing a multi-mode transportation route. Multi-mode transportation program 112 has the ability to receive user data for the traveling user and user data for any user accompanying the traveling user on the generated route and modified the generated route based on a generated confidence score of any of the users (i.e., traveling user and accompanying users).

Figure 4:
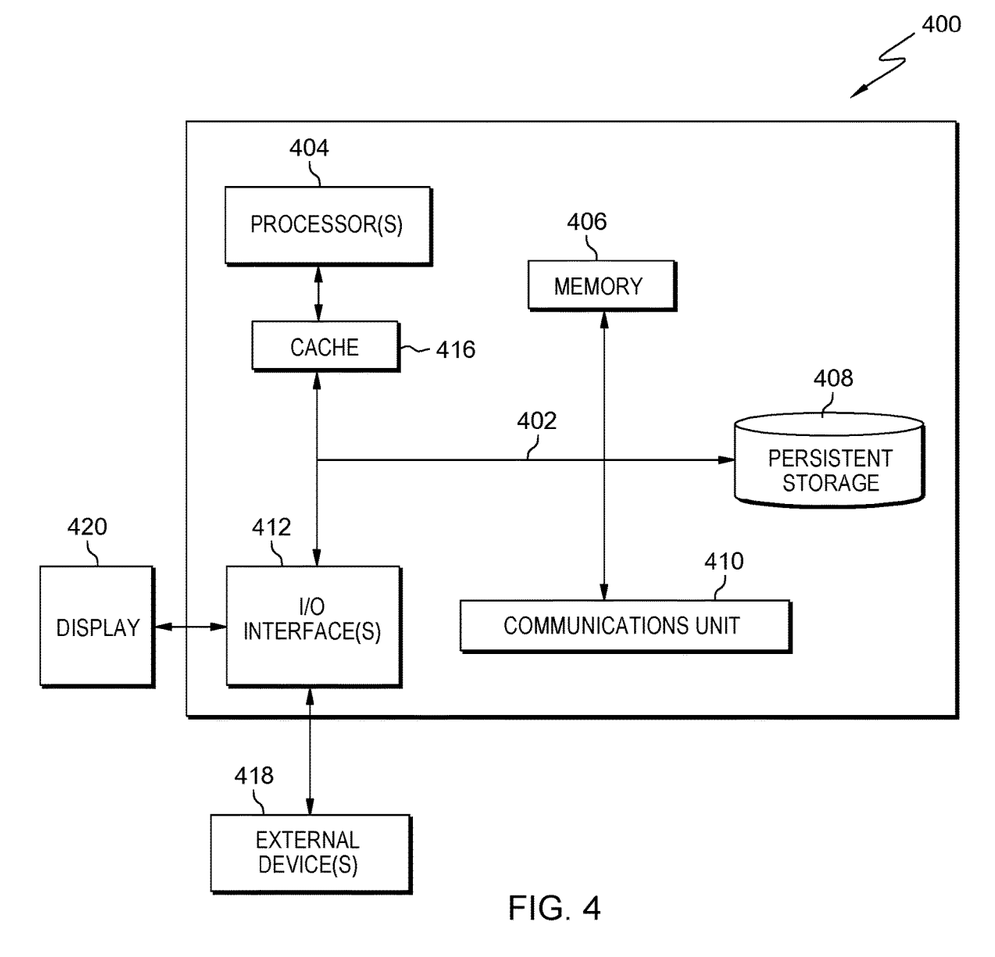
FIG. 4 is a block diagram of components of a computer system, such as the server computer of FIG. 1, in accordance with an embodiment of the present invention.

FIG. 4 depicts computer system 400, where server computer 102, client device 104, and client device 106 are examples of a system that include multi-mode transportation program 112. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 402 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 406 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
displaying, by one or more processors, guidance for a generated route based on a travel itinerary between an origin location and a destination location, wherein the generated route includes at least one mode of a public transportation alteration;
receiving, by the one or more processors, user data associated with a user traveling at a specific point along the generated route;
generating, by the one or more processors, a confidence score for the user traveling along the generated route based on the received user data;
responsive to determining the confidence score is below a confidence level threshold, determining, by the one or more processors, the at least one mode of public transportation alteration caused the confidence score to fall below the confidence level threshold, wherein the at least one mode of public transportation alteration includes a change from a first mode of public transportation and a second mode of public transportation;
instructing, by the one or more processors, the user traveling along the generated route to revert back to the first mode of public transportation; and
displaying, by the one or more processors, guidance for the modified route.

2. The method of claim 1, wherein further comprising:
determining, by the one or more processors, a duration of time spent on the first mode of public transportation caused the confidence score to rise above the confidence level threshold; and
instructing, by the one or more processors, the user traveling along the generated route to perform the at least one mode of public transportation alteration, wherein the user transfers between the first mode of public transportation to the second mode of public transportation.

3. The method of claim 1, further comprising:
responsive to determining the destination location has not been reached, determining, by the one or more processors, whether the confidence score for the user traveling along the generated route at the specific point is above the confidence level threshold.

4. The method of claim 1, wherein the confidence score is based on an amount of anxiety the user is experiencing at the specific point along the generated route.

5. The method of claim 1, wherein displaying guidance for the modified route includes an animation utilizing virtual reality (VR) technology with instructions.

6. The method of claim 1, further comprising:
identifying, by the one or more processors, a user profile associated with the user;
receiving, by the one or more processors, the travel itinerary identifying the origin location and the destination location;
receiving, by the one or more processors, a plurality of data include historical travel data for the user, current travel data for the user, and travel condition data for a plurality of modes of public transportation; and
responsive to generating a route for the travel itinerary based on the plurality of data, initializing, by the one or more processors, guidance for the generated route.

7. A computer program product comprising:
one or more computer readable non-transitory storage media and program instructions stored on at least one of the one or more computer readable non-transitory storage media, the program instructions comprising:
the program instructions to display guidance for a generated route based on a travel itinerary between an origin location and a destination location, wherein the generated route includes at least one mode of a public transportation alteration;
the program instructions to receive user data associated with a user traveling at a specific point along the generated route;
the program instructions to generate a confidence score for the user traveling along the generated route based on the received user data;
the program instructions to, responsive to determining the confidence score is below a confidence level threshold, determine the at least one mode of public transportation alteration caused the confidence score to fall below the confidence level threshold, wherein the at least one mode of public transportation alteration includes a change from a first mode of public transportation and a second mode of public transportation;

the program instructions to instruct the user traveling along the generated route to revert back to the first mode of public transportation; and the program instructions to display guidance for the modified route.

8. The computer program product of claim 7, further comprising the program instructions, stored on the one or more computer readable storage media, which when executed by a processor, cause the processor to:

determine a duration of time spent on the first mode of public transportation caused the confidence score to rise above the confidence level threshold; and instruct the user traveling along the generated route to perform the at least one mode of public transportation alteration, wherein the user transfers between the first mode of public transportation to the second mode of public transportation.

9. The computer program product of claim 7, further comprising the program instructions, stored on the one or more computer readable storage media, which when executed by a processor, cause the processor to:

responsive to determining the destination location has not been reached, whether the confidence score for the user traveling along the generated route at the specific point is above the confidence level threshold.

10. The computer program product of claim 7, wherein the confidence score is based on an amount of anxiety the user is experiencing at the specific point along the generated route.

11. The computer program product of claim 7, wherein displaying guidance for the modified route includes an animation utilizing virtual reality (VR) technology with instructions.

12. The computer program product of claim 7, further comprising the program instructions, stored on the one or more computer readable storage media, which when executed by a processor, cause the processor to:

identify a user profile associated with the user;

receive the travel itinerary identifying the origin location and the destination location;

receive a plurality of data include historical travel data for the user, current travel data for the user, and travel condition data for a plurality of modes of public transportation; and responsive to generating a route for the travel itinerary based on the plurality of data, initialize guidance for the generated route.

13. A computer system comprising:

one or more computer processors;

one or more computer readable storage media; and program instructions stored on the computer readable storage media for execution by at least one of the one or more computer processors, the program instructions comprising:

the program instructions to display guidance for a generated route based on a travel itinerary between an origin location and a destination location, wherein the generated route includes at least one mode of a public transportation alteration;

the program instructions to receive user data associated with a user traveling at a specific point along the generated route;

the program instructions to generate a confidence score for the user traveling along the generated route based on the received user data;

the program instructions to, responsive to determining the confidence score is below a confidence level threshold, determine the at least one mode of public transportation alteration caused the confidence score to fall below the confidence level threshold, wherein the at least one mode of public transportation alteration includes a change from a first mode of public transportation and a second mode of public transportation;

the program instructions to instruct the user traveling along the generated route to revert back to the first mode of public transportation; and the program instructions to display guidance for the modified route.

14. The computer system of claim 13, further comprising the program instructions, stored on the one or more computer readable storage media, which when executed by a processor, cause the processor to:

determine a duration of time spent on the first mode of public transportation caused the confidence score to rise above the confidence level threshold; and instruct the user traveling along the generated route to perform the at least one mode of public transportation alteration, wherein the user transfers between the first mode of public transportation to the second mode of public transportation.

15. The computer system of claim 13, further comprising the program instructions, stored on the one or more computer readable storage media, which when executed by a processor, cause the processor to:

responsive to determining the destination location has not been reached, determine whether the confidence score for the user traveling along the generated route at the specific point is above the confidence level threshold.

16. The computer system of claim 13, wherein the confidence score is based on an amount of anxiety the user is experiencing at the specific point along the generated route.

17. The computer system of claim 13, wherein displaying guidance for the modified route includes an animation utilizing virtual reality (VR) technology with instructions.

18. The computer system of claim 13, further comprising the program instructions, stored on the one or more computer readable storage media, which when executed by a processor, cause the processor to:

identify a user profile associated with the user;

receive the travel itinerary identifying the origin location and the destination location;

receive a plurality of data include historical travel data for the user, current travel data for the user, and travel condition data for a plurality of modes of public transportation; and responsive to generating a route for the travel itinerary based on the plurality of data, initialize guidance for the generated route.

* * * * *